US011859428B2

(12) United States Patent
Li et al.

(10) Patent No.: US 11,859,428 B2
(45) Date of Patent: Jan. 2, 2024

(54) AUTOMATIC DOOR DEVICE AND HOUSEHOLD APPLIANCE

(71) Applicant: BSH Hausgeraete GMBH, Munich (DE)

(72) Inventors: Guojie Li, Nanjing (CN); Jun Chen, Nanjing (CN); Huijuan Wang, Nanjing (CN); Tao Sun, Nanjing (CN); Xiuwei Wu, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 157 days.

(21) Appl. No.: 17/439,130

(22) PCT Filed: Apr. 3, 2020

(86) PCT No.: PCT/EP2020/059627

§ 371 (c)(1),
(2) Date: Sep. 14, 2021

(87) PCT Pub. No.: WO2020/221553

PCT Pub. Date: Nov. 5, 2020

(65) Prior Publication Data

US 2022/0145686 A1 May 12, 2022

(30) Foreign Application Priority Data

Apr. 30, 2019 (CN) ........................ 201910366802.7

(51) Int. Cl.
*E05F 15/00* (2015.01)
*E05F 15/614* (2015.01)

(52) U.S. Cl.
CPC ....... *E05F 15/614* (2015.01); *E05Y 2201/216* (2013.01); *E05Y 2201/266* (2013.01);
(Continued)

(58) Field of Classification Search
CPC ............ E05F 15/614; E05Y 2201/216; E05Y 2201/266; E05Y 2400/36; E05Y 2400/44;
(Continued)

(56) References Cited

U.S. PATENT DOCUMENTS

2017/0097185 A1* 4/2017 Yasaka .................. F25D 23/028
2017/0284144 A1* 10/2017 Yasaka .................. F25D 23/028
(Continued)

FOREIGN PATENT DOCUMENTS

CN 107654152 A 2/2018
CN 108316802 A 7/2018
WO 2017171292 A1 10/2017

*Primary Examiner* — Chi Q Nguyen
(74) *Attorney, Agent, or Firm* — Laurence A. Greenberg; Werner H. Stemer; Ralph E. Locher

(57) ABSTRACT

An automatic door device includes a driving motor and a transmission system. An input end of the transmission system is coupled to an output shaft of the driving motor, an output end of the transmission system is coupled to a door shaft, and the transmission system has a transmission link to transmit an output torque of the driving motor to the door shaft. A clutch mechanism is disposed on the transmission link of the transmission system. Accordingly, when the door is subjected to an external force, the transmission link between the door and the driving motor can be automatically disconnected, so that while an automatic door function implemented, it is ensured that a user may not be affected by the resistance brought by the automatic door device when the user opens/closes the door manually, thereby optimizing user experience.

18 Claims, 9 Drawing Sheets

(52) U.S. Cl.
CPC ..... *E05Y 2201/434* (2013.01); *E05Y 2201/71* (2013.01); *E05Y 2400/31* (2013.01); *E05Y 2400/32* (2013.01); *E05Y 2400/36* (2013.01); *E05Y 2400/44* (2013.01); *E05Y 2400/45* (2013.01); *E05Y 2400/852* (2013.01); *E05Y 2900/30* (2013.01)

(58) Field of Classification Search
CPC ........... E05Y 2400/45; E05Y 2400/852; E05Y 2900/31; E05Y 2400/32; E05Y 2400/31; E05Y 2201/426; E05Y 2201/71; E05Y 2201/434; E05Y 2900/30; F25D 23/028; F25D 2323/024; E06B 3/367
See application file for complete search history.

(56) References Cited

U.S. PATENT DOCUMENTS

| | | | | |
|---|---|---|---|---|
| 2018/0128540 | A1* | 5/2018 | Yasaka | B66F 7/02 |
| 2021/0372506 | A1* | 12/2021 | McGrew, Jr. | F16H 3/725 |
| 2021/0396461 | A1* | 12/2021 | Cho | F25D 29/00 |
| 2023/0003072 | A1* | 1/2023 | Eom | E05F 15/614 |
| 2023/0003075 | A1* | 1/2023 | Kang | E05F 15/79 |
| 2023/0095878 | A1* | 3/2023 | Eom | F16H 1/02<br>49/31 |

* cited by examiner

AUTOMATIC DOOR DEVICE AND HOUSEHOLD APPLIANCE

BACKGROUND OF THE INVENTION

Field of the Invention

The present invention relates to the technical field of household appliances, and specifically, to an automatic door device and a household appliance.

Description of the Related Art

To facilitate daily life of people, automatic door systems are gradually spread to every corner of cities. For example, an auto-inductive door in a mall can automatically open the door when a pedestrian moves close without any manual operation.

In the field of household appliances, application of the automatic door systems is still in a technology blank. Currently, most household appliances on the market are not equipped with an automatic door function, and even though there are household appliances integrated with an automatic door system, many disadvantages still exist in the design, leading to low user favorability.

For example, when a user is eager to open or close a door body, the user may select to open/close the door manually instead of waiting for the constant speed driving of the automatic door system. In this case, because the rotation of the door body may drive a transmission system and a driving motor of the automatic door system to rotate, whether the manual operation direction of the user to the door body is the same as or opposite to the current driving direction of the automatic door system to the door body, the manual operation of the user may be subjected to relatively great resistance due to the automatic door system, and the user even cannot manually open/close the door body.

This is against the requirement of the user for operation convenience of the household appliance, and reduces user experience.

SUMMARY OF THE INVENTION

An objective of embodiments of the present invention is to provide an improved automatic door device and a household appliance.

Therefore, according to a first aspect, an embodiment of the present invention provides an automatic door device, including a driving motor and a transmission system. An input end of the transmission system is coupled to an output shaft of the driving motor, an output end of the transmission system is coupled to a door shaft, and the transmission system has a transmission link to transmit an output torque of the driving motor to the door shaft. A clutch mechanism is disposed on the transmission link of the transmission system.

Compared with the existing technical solution in which the automatic door device is coupled to the door shaft all the time, when the door is subjected to an external force, in the solution of this embodiment, the transmission link between the door and the driving motor can be automatically disconnected, so that while the automatic door function is implemented, it is ensured that a user may not be affected by the resistance brought by the automatic door device when the user opens/closes the door manually, thereby optimizing user experience.

Optionally, the clutch mechanism is in an engaged state when the door shaft is not subjected to an external torque; and the clutch mechanism enters a separated state to disconnect the transmission link when the door shaft is subjected to an external torque in a same direction. Based on this, in the engaged state, an output torque of the driving motor may be transmitted to the door shaft by using the transmission link, to implement an automatic door effect by using the driving motor to drive the door shaft to rotate; and in the separated state, the transmission link is disconnected, the output torque of the driving motor cannot be transmitted to the door shaft, and the door shaft is not subjected to the force applied by the driving motor, so that the user can operate the door body casually without feeling additional resistance.

Further, the same direction refers to being in the same direction with the torque applied by the transmission system to the door shaft. For example, when the transmission system is driven by the driving motor to drive the door shaft to rotate to open the door, the user manually operates the door body to accelerate the opening of the door, and in this case, the clutch mechanism enters a separated state, to ensure that the user can softly open the door manually. For another example, when the transmission system is driven by the driving motor to drive the door shaft to rotate to close the door, the user manually operates the door body to accelerate the closing of the door, and in this case, the clutch mechanism enters a separated state, to ensure that the user can softly close the door manually.

Optionally, the transmission system includes: a first set of transmission gears, where a first gear in the first set of transmission gears is coupled to the output shaft of the driving motor, and a last gear is coupled to the input end of the clutch mechanism; and a second set of transmission gears, where a first gear in the second set of transmission gears is coupled to the output end of the clutch mechanism, and a last gear is coupled to the door shaft. Based on this, when the clutch mechanism is in an engaged state, the first set of transmission gears and the second set of transmission gears are coupled through the clutch mechanism, to make the transmission link connected; and when the clutch mechanism is in a separated state, the first set of transmission gears and the second set of transmission gears are separated from each other under the action of the clutch mechanism, to make the transmission link disconnected.

Optionally, the clutch mechanism includes: a first main gear, coupled to the last gear in the first set of transmission gears; and a first auxiliary gear, disposed coaxially with the first main gear, and coupled to the first gear in the second set of transmission gears. A limiting portion is disposed at one side of the first main gear facing the first auxiliary gear, and an adaptation portion is disposed at one side of the first auxiliary gear facing the first main gear. When the first main gear is driven by the first set of transmission gears to rotate to the limiting portion to abut against the adaptation portion, the clutch mechanism is in an engaged state; and when the first auxiliary gear is driven by the second set of transmission gears to rotate to the adaptation portion to be separated from the limiting portion, the clutch mechanism is in a separated state. Therefore, through the cooperation between the limiting portion and the adaptation portion, the clutch mechanism can freely switch between the engaged state and the separated state, to implement connection and disconnection of the transmission link.

Optionally, the limiting portion includes a limiting groove. The limiting groove has a first closed end and a second closed end. When the limiting groove rotates with the first main gear to the adaptation portion to abut against the first closed end or the second closed end, the clutch mechanism is in an engaged state; and when the adaptation portion rotates with the first auxiliary gear to be separated from the first closed end or the second closed end and slides in the limiting groove, the clutch mechanism is in a separated state. Therefore, when the limiting groove rotates with the first main gear to the adaptation portion to abut against the first closed end or the second closed end, the clutch mechanism is in an engaged state and the door shaft can rotate along the opening direction or the closing direction under the drive of the driving motor; and when the door shaft is subjected to an external torque in the same direction, the design of the limiting groove provides a free motion distance for the adaptation portion, so that the door shaft can accelerate the rotation without being limited by the resistance of the driving motor.

Optionally, the adaptation portion includes a boss, to be effectively coupled to the limiting groove, to ensure that the clutch mechanism can flexibly switch between the engaged state and the separated state.

Optionally, the automatic door device further includes a torque control mechanism disposed on the transmission link of the transmission system. When the door shaft is subjected to an external torque in a reversed direction, the torque control mechanism is adapted to disconnect the transmission link. The reversed direction refers to being in the reversed direction with the torque applied by the transmission system to the door shaft. Therefore, when the rotation direction of the door body applied by the user and the rotation direction of the door shaft applied by the driving motor are reversed, the transmission link can be disconnected by the torque control mechanism, to protect the driving motor and the transmission system.

Optionally, the transmission system includes: a first set of transmission gears, where a first gear in the first set of transmission gears is coupled to the output shaft of the driving motor, and a last gear is coupled to the input end of the clutch mechanism; and a second set of transmission gears, where a first gear in the second set of transmission gears is coupled to the output end of the clutch mechanism, and a last gear is coupled to the door shaft. Based on this, when the clutch mechanism is in an engaged state, the first set of transmission gears and the second set of transmission gears are coupled through the clutch mechanism, to make the transmission link connected; and when the clutch mechanism is in a separated state, the first set of transmission gears and the second set of transmission gears are separated from each other under the action of the clutch mechanism, to make the transmission link disconnected.

Optionally, the torque control mechanism includes a second main gear, coupled to the last gear in the first set of transmission gears; a second auxiliary gear, disposed coaxially with the second main gear and coupled to the input end of the clutch mechanism; and an elastic piece, adapted to connect the second main gear and the second auxiliary gear. When a rotation direction of the second main gear and a rotation direction of the second auxiliary gear are reversed, and a torque transmitted by the second auxiliary gear on the elastic piece is greater than a preset threshold, the second main gear and the second auxiliary gear release to disconnect the transmission link. Specifically, when the rotation directions of the second main gear and the second auxiliary gear are the same, or although the rotation directions are reversed but the transmitted torque is less than the preset threshold, the second main gear and the second auxiliary gear rotate synchronously, and there is no relative rotation between the two gears in the circumferential direction. In this case, the transmission link is in a connection state. When the rotation directions of the second main gear and the second auxiliary gear are reversed, and the transmitted torque is greater than the preset threshold, the second main gear and the second auxiliary gear release under the action of the elastic piece, and relative rotation is generated between the two gears in the circumferential direction to disconnect the transmission link. Therefore, the transmission link can be actively disconnected when the torque is excessive due to abnormal operation, to protect the driving motor and the transmission system, and prolong the service life of components.

Optionally, the automatic door device further includes a control module. The control module is coupled to the driving motor, and the driving motor determines an output torque according to a driving instruction sent by the control module. Therefore, the running state of the driving motor is adjusted by the control module, to implement the automatic door function.

Optionally, in response to the external torque in a reversed direction to which the door shaft is subjected, the control module sends an updated driving instruction to instruct the driving motor to output a reversed output torque. Therefore, when a reversed operation of the user to the door body is sensed, the driving motor is controlled in time to adjust the output torque, so that the driving direction of the transmission system to the door shaft meets user expectation.

Optionally, the automatic door device further includes a control module. The control module is coupled to the driving motor, and the driving motor determines an output torque according to a driving instruction sent by the control module. Therefore, the running state of the driving motor is adjusted by the control module, to implement the automatic door function.

Optionally, the automatic door device further includes: an angle sensing module, coupled to the door shaft and the control module, and adapted to sense and send a rotation angle of the door shaft to the control module. Therefore, the location of the door body is detected in real time by the angle sensing module, and the control module can determine the running state of the driving motor and/or the real-time state of the clutch mechanism according to the real-time location of the door body, to implement different actions according to different locations of the door body.

Optionally, the angle sensing module includes: a third transmission gear, rotating with the door shaft synchronously; and an angle sensor, connected to the third transmission gear, to sense a rotation angle of the third transmission gear. Therefore, the rotation angle of the door shaft can be precisely detected by using the third transmission gear, to determine the real-time location of the door body.

Optionally, when the rotation angle of the door shaft is not zero and the door shaft is in a static state for preset duration, the control module generates the driving instruction. Therefore, automatic closing of the door body can be implemented in a case that the door is not closed in a long time, to achieve effects of energy saving and environmental protection.

Optionally, when the rotation angle of the door shaft is a first preset angle and a door closing instruction sent by the user is received, a first reminding signal is sent; and/or, when the rotation angle of the door shaft is a second preset angle and a door opening instruction sent by the user is received, a second reminding signal is sent. Therefore, when the door open/close instructions sent by the user are not adapted to the current location of the door body, a reminding signal may be sent to remind the user to modify the door open/close instructions in time, to prevent the user from performing wrong operation to damage the door body, thereby prolonging the service life of the door body. For example, when the rotation angle of the door shaft is zero, that is, when the door body is located at the closing location, if the door closing instruction is received, the door closing instruction is not responded and the first reminding signal is sent, to remind the user that the door body is already located at the closing location. For another example, when the rotation angle of the door shaft is a maximum rotatable angle, that is, when the door body is opened to the maximum angle, if the door opening instruction is received, the door opening instruction is not responded and the second reminding signal is sent, to remind the user that the door body is already located at the maximum opening location.

Optionally, a trigger manner of the door closing instruction and/or the door opening instruction is selected from: key pressing, voice input and motion sensing. Therefore, the operation methods of the user are enriched by using various instruction trigger manners, thereby improving the operation convenience of the user and optimizing the user experience.

Optionally, the automatic door device further includes: a speed monitoring module, coupled to the control module, and adapted to monitor and send running parameters of the driving motor to the control module. Therefore, the running parameters of the driving motor can be detected in real time and fed back to the control module, so that the control module can properly adjust the running state of the driving motor according to the real-time running parameters of the driving motor, to make the automatic door control for the door shaft meet the user expectation.

Optionally, the speed monitoring module includes a Hall sensor, to precisely detect the running parameters of the driving motor.

Optionally, the automatic door device further includes: an angle sensing module, coupled to the door shaft and the control module, and adapted to sense and send a rotation angle of the door shaft to the control module. Therefore, the location of the door body is detected in real time by the angle sensing module, and the control module can determine the running state of the driving motor and/or the real-time state of the clutch mechanism according to the real-time location of the door body, to implement different actions according to different locations of the door body.

Optionally, the control module determines an updated driving instruction and sends the instruction to the driving motor according to the rotation angle of the door shaft and the running parameters of the driving motor, to make a running speed of the door shaft maintain constant. The updated driving instruction includes updated running parameters. Therefore, a stable door opening/closing speed can be implemented under different loads.

According to a second aspect, an embodiment of the present invention provides a household appliance, including a body and a door body connected to the front of the body, and further including a door shaft. The door shaft is adapted to hinge the body and the door body, and the door body may rotate around the door shaft. The household appliance further includes the automatic door device described above, and the automatic door device is coupled to the door shaft to drive the door shaft to rotate. Compared with the existing household appliances, the household appliance in this embodiment is equipped with the automatic door device, which can implement an automatic door function. Further, a clutch mechanism is integrated in the automatic door device, and may actively disconnect the transmission link from the driving motor to the door shaft when a user needs to operate the door body manually, so that the user does not feel the resistance of the driving motor and the transmission system during manual operation, thereby optimizing user experience.

Optionally, the door body includes a door end cover. The door end cover includes a shaft hole to receive the door shaft, and the door end cover is further adapted to accommodate the automatic door device. Therefore, according to the design in which the automatic door device is integrated in the door end cover, the automatic door device is in an invisible state to the outside, which facilitates the overall appearance of the household appliance.

The household appliance may be a cooling appliance (e.g. refrigerator, freezer, fridge-freezer-combination, e.g. French door appliance), a dishwasher, a cooking appliance (e.g. oven), a washing appliance (e.g. washing machine or tumble dryer) or the like.

DETAILED DESCRIPTION OF THE INVENTION

Figure 1:
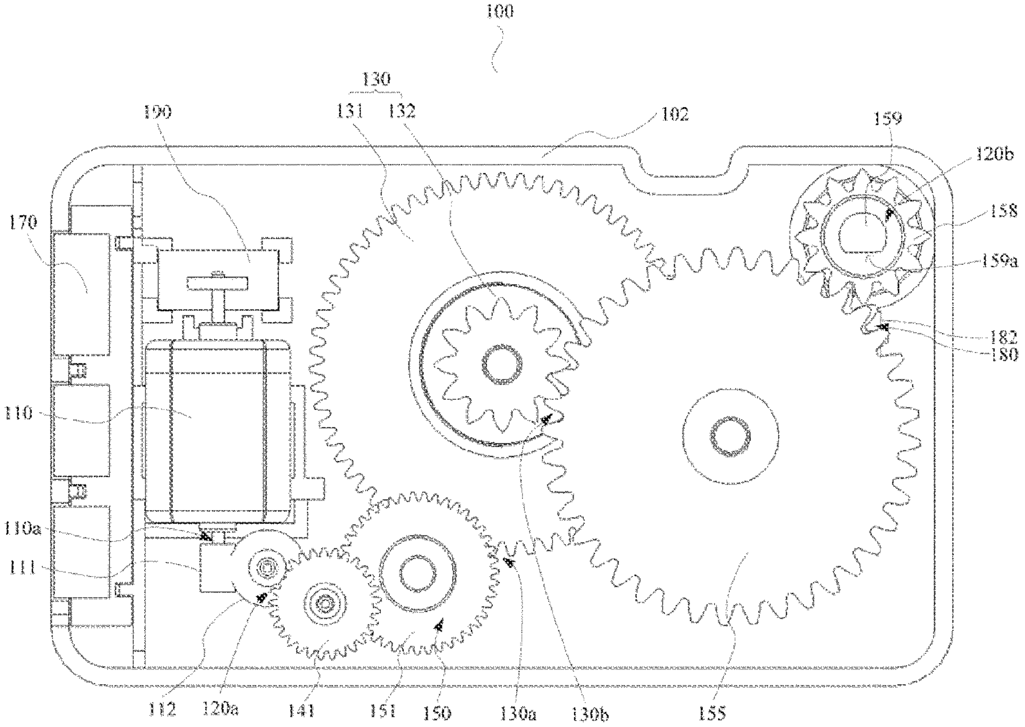
FIG. 1 is a schematic diagram of an automatic door device according to an embodiment of the present invention.

100—Automatic door device; 101—Top cover; 102—Bottom cover; 103—First through hole; 101—Driving motor; **110*a*—Output shaft of the driving motor; 111—Worm; 112—Turbine; 113—First shaft; 114—First accommodating portion; 115—Magnet; 120—Transmission system; 120*a*—input end of the transmission system; 121—First set of transmission gears; 122—Second set of transmission gears; 120*b*—Output end of the transmission system; 130—Clutch mechanism; 130*a*—input end of the clutch mechanism; 130*b*—Output end of the clutch mechanism; 131—First main gear; 132—First auxiliary gear; 133—Limiting portion; 134—Adaptation portion; 135—Fifth shaft; 136—Fifth accommodating portion; 137—Limiting groove; 138—Boss; 137***a*—First closed end; 137*b*—Second closed end; 141—Third main gear; 142—Third auxiliary gear; 143—Second shaft; 144—Second accommodating portion; 150—Torque control mechanism; 151—Second main gear; 152—Second auxiliary gear; 153—Third shaft; 154—Third accommodating portion; 155—First transmission gear; 156—Fourth shaft; 157—Fourth accommodating portion; 158—Second transmission gear; 159—Second through hole; 159*a*—Notch of the second through hole; 160—Elastic piece; 161—Protruding portion; 170—Control module; 171—First fixing portion; 180—Angle sensing module; 181—Third transmission gear; 182—Angle sensor; 183—Sixth accommodating portion; 184—Third through hole; 190—Speed monitoring module; 191—Second fixing portion; 200—Household appliance; 201—Body; 202—Door body; 203—Door shaft; 204—Door end cover; 205—Shaft hole; and α—Rotation angle of the door body.

DETAILED DESCRIPTION

As described in the Background, the existing household appliances are generally not equipped with the automatic door system, or although are equipped with the automatic door system, the requirement of the user for operation convenience cannot be met while the automatic door function is implemented, affecting the user experience.

To resolve the foregoing technical problem, an embodiment of the present invention provides an automatic door device, including a driving motor and a transmission system. An input end of the transmission system is coupled to an output shaft of the driving motor, an output end of the transmission system is coupled to a door shaft, and the transmission system includes a transmission link to transmit an output torque of the driving motor to the door shaft. A clutch mechanism is disposed on the transmission link of the transmission system.

According to the solution in this embodiment, when the door is subjected to an external force, the transmission link between the door and the driving motor can be automatically disconnected by using the clutch mechanism, so that while an automatic door function is implemented, it is ensured that a user may not be affected by the resistance brought by the automatic door device when the user opens/closes the door manually, thereby optimizing user experience.

To make the foregoing objectives, features and advantages of the present invention more obvious and understandable, specific embodiments of the present invention are described in detail with reference to the accompanying drawings.

Figure 2:
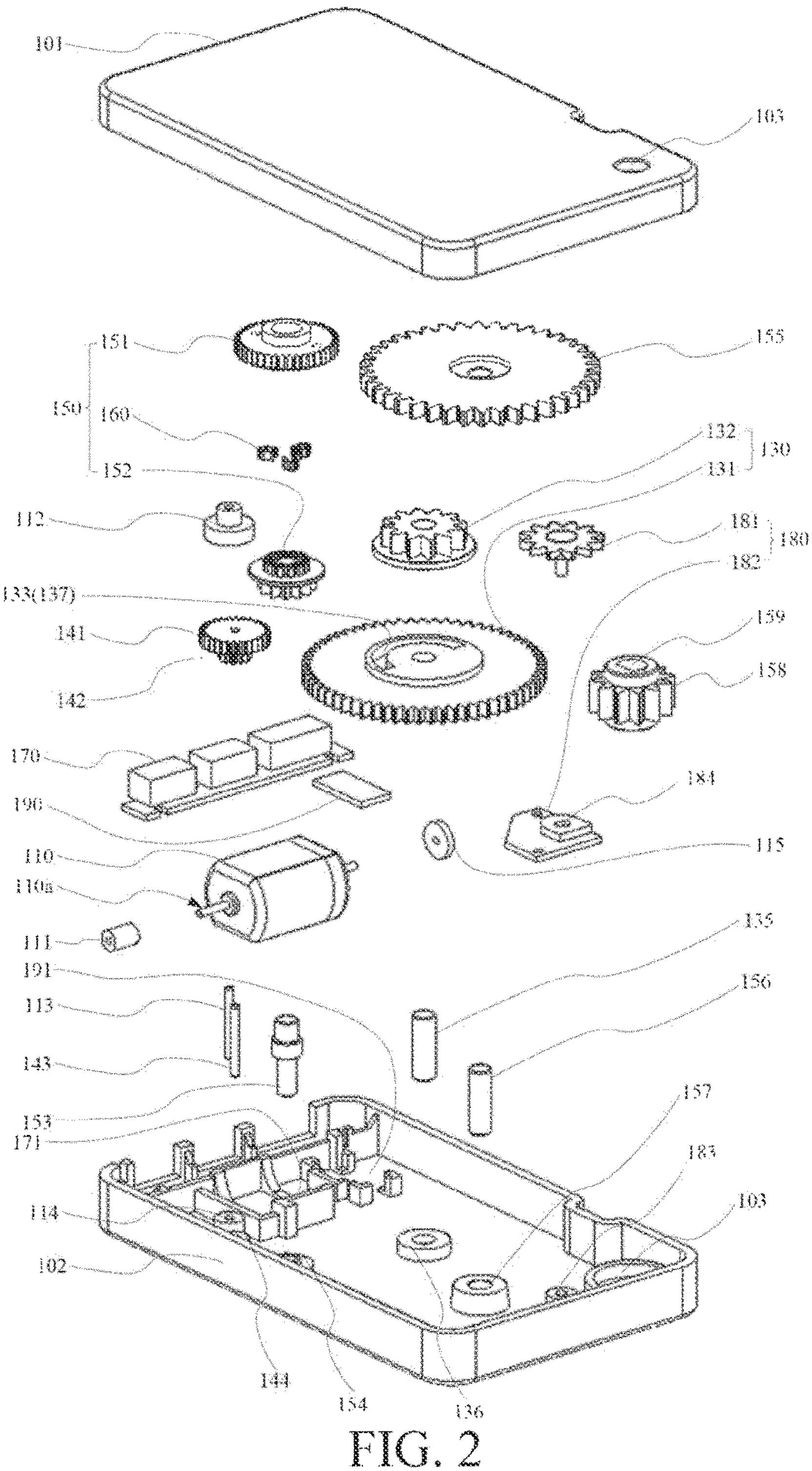
FIG. 2 is an exploded view of the automatic door device shown in FIG. 1.

FIG. 1 is a schematic diagram of an automatic door device according to an embodiment of the present invention; and FIG. 2 is an exploded view of the automatic door device shown in FIG. 1. To show the internal structure of an automatic door device 100 more clearly, a top cover 101 in FIG. 2 is not shown in FIG. 1.

Figure 15:
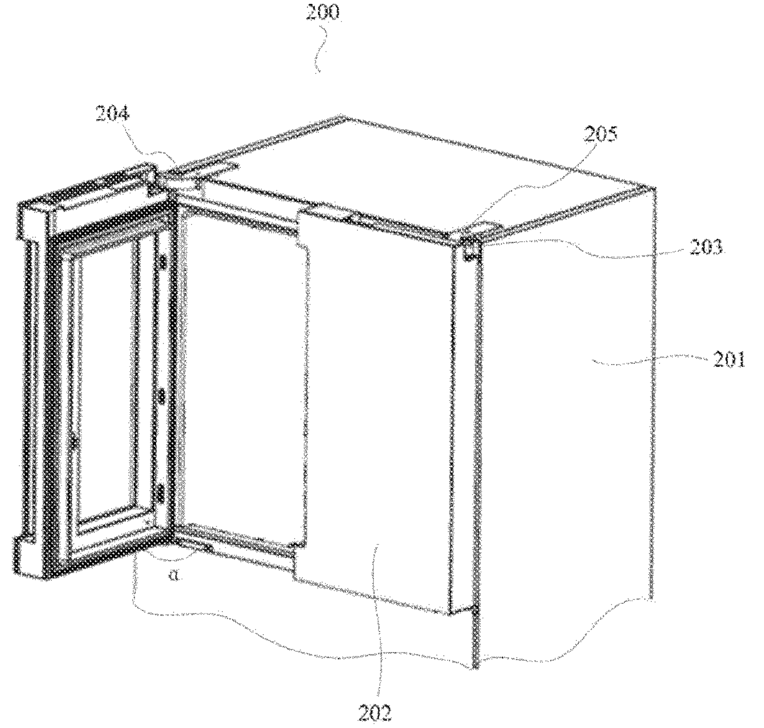
FIG. 15 is a schematic diagram of a household appliance according to an embodiment of the present invention.

Specifically, referring to FIG. 1 and FIG. 2, the automatic door device 100 in this embodiment may include a driving motor 110 and a transmission system 120. An input end 120*a* of the transmission system 120 may be coupled to an output shaft 110*a* of the driving motor 110, an output end 120*b* of the transmission system 120 may be coupled to a door shaft 203 (as shown in FIG. 15), and the transmission system 120 may have a transmission link to transmit an output torque of the driving motor 110 to the door shaft 203. A clutch mechanism 130 is disposed on the transmission link of the transmission system 120.

According to the solution in this embodiment, when a door body 202 (as shown in FIG. 15) is subjected to an external force, the automatic door device 100 may automatically disconnect the transmission link between the door and the driving motor 110 by using a clutch mechanism 130, so that while an automatic door function is implemented, it is ensured that a user may not be affected by the resistance brought by the automatic door device 100 when the user opens/closes the door manually, thereby optimizing user experience.

For example, the automatic door device 100 may include a top cover 101 and a bottom cover 102. Components such as the driving motor 110, the transmission system 120, and the clutch mechanism 130 are all disposed on one side of the bottom cover 102 facing the top cover 101, and the top cover 101 is adapted to cover the bottom cover 102, to seal the foregoing components into a cavity formed by the top cover 101 and the bottom cover 102.

Further, first through holes 103 are respectively provided at suitable locations at the top cover 101 and the bottom cover 102, and the first through holes 103 are adapted for the door shaft 203 to pass through. Therefore, the door shaft 203 passes through the automatic door device 100 and hinges the door body 202 and the body 201 of the household appliance 200 (as shown in FIG. 15), and the door shaft 203 may be driven by the driving motor 110 to implement the automatic door function.

Further, the clutch mechanism 130 may be in an engaged state when the door shaft 203 is not subjected to an external torque; and the clutch mechanism 130 may enter a separated state to disconnect the transmission link when the door shaft 203 is subjected to an external torque in a same direction. Based on this, in the engaged state, an output torque of the driving motor 110 may be transmitted to the door shaft 203 by using the transmission link, to implement an automatic door effect by using the driving motor 110 to drive the door shaft 203 to rotate; and in the separated state, the transmission link is disconnected, the output torque of the driving motor 110 cannot be transmitted to the door shaft 203, and the door shaft 203 is not subjected to the force applied by the driving motor 110, so that the user can operate the door body 202 casually without feeling additional resistance.

Further, the same direction refers to being in the same direction with the torque applied by the transmission system 120 to the door shaft 203. For example, when the transmission system 120 is driven by the driving motor 110 to drive the door shaft 203 to rotate to open the door, the user manually operates the door body 202 to accelerate the opening of the door, and in this case, the clutch mechanism 130 enters a separated state, to ensure that the user can softly open the door manually. For another example, during the transmission system 120 is driven by the driving motor 110 to drive the door shaft 203 to rotate to close the door, the user manually operates the door body 202 to accelerate the closing of the door, and in this case, the clutch mechanism 130 enters a separated state, to ensure that the user can softly close the door manually.

Figure 3:
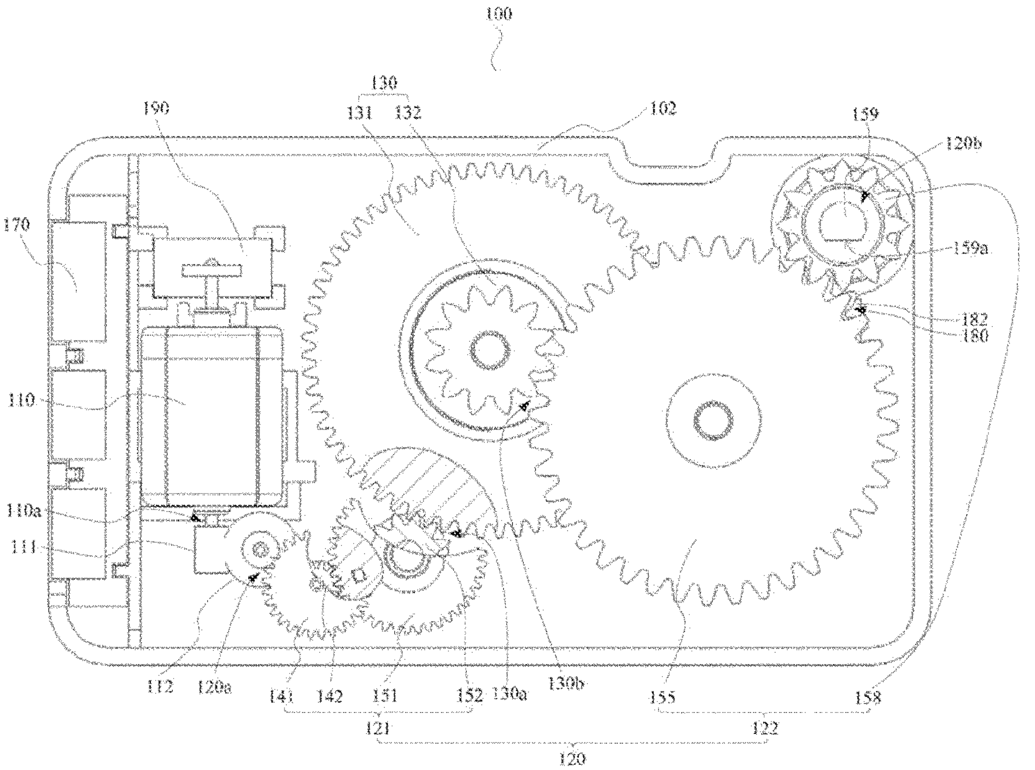
FIG. 3 is a schematic diagram of a transmission link of a transmission system in FIG. 1.

In an embodiment, with reference to FIG. 1 to FIG. 3, the transmission system 120 may include: a first set of transmission gears 121, where a first gear in the first set of transmission gears 121 is coupled to the output shaft 110*a* of the driving motor 110, and a last gear is coupled to the input end 130*a* of the clutch mechanism 130; and a second set of transmission gears 122, where a first gear in the second set of transmission gears 122 is coupled to the output end 130*b* of the clutch mechanism 130, and a last gear is coupled to the door shaft 203. Based on this, when the clutch mechanism 130 is in an engaged state, the first set of transmission gears 121 and the second set of transmission gears 122 are coupled through the clutch mechanism 130, to make the transmission link connected; and when the clutch mechanism 130 is in a separated state, the first set of transmission gears 121 and the second set of transmission gears 122 are separated from each other under the action of the clutch mechanism 130, to make the transmission link disconnected.

For example, the output shaft 110*a* of the driving motor 110 is coupled to a worm 111, the worm 111 is coupled to a turbine 112, and the turbine 112 is coupled to the first gear of the first set of transmission gears 121.

Specifically, the turbine 112 is rotatably fixed on the bottom cover 102 through a first shaft 113, a first accommodating portion 114 may be fixed on the bottom cover 102, and the first shaft 113 may be inserted into an accommodating hole provided on the first accommodating portion 114 to fix the turbine 112.

Further, the first set of transmission gears 121 may include a third main gear 141 and a third auxiliary gear 142 that are disposed coaxially, and the two gears may be rotatably fixed on the bottom cover 102 through a second shaft 143. In addition, the third main gear 141 and the third auxiliary gear 142 may rotate synchronously around the second shaft 143. The third main gear 141 may be the first gear of the first set of transmission gears 121. That is, the third main gear 141 is coupled to the turbine 112.

Further, a second accommodating portion 144 may be fixed on the bottom cover 102, and the second shaft 143 may be inserted into an accommodating hole provided on the second accommodating portion 144, to fix the third main gear 141 and the third auxiliary gear 142.

Further, the first set of transmission gears 121 may further include a second main gear 151 and a second auxiliary gear 152 that are disposed coaxially, and the two gears may be rotatably fixed on the bottom cover 102 through a third shaft 153. In addition, the second main gear 151 and the second auxiliary gear 152 may rotate synchronously around the third shaft 153.

Further, a third accommodating portion 154 may be fixed on the bottom cover 102, and the third shaft 153 may be inserted into an accommodating hole provided on the third accommodating portion 154, to fix the second main gear 151 and the second auxiliary gear 152.

Further, the third auxiliary gear 142 is engaged with and the second main gear 151, and the second auxiliary gear 152 is coupled to the input end 130*a* of the clutch mechanism 130.

Therefore, the output torque of the driving motor 110 is transmitted to the third main gear 141 through the worm 111 and the turbine 112 sequentially by the output shaft 110*a* of the driving motor 110. Then, the output torque is transmitted to the second main gear 151 engaged with the third auxiliary gear by the third auxiliary gear 142 rotating synchronously with the third main gear 141, and is then transmitted to the input end 130*a* of the clutch mechanism 130 coupled to the second auxiliary gear 152 by the second auxiliary gear 152 rotating synchronously with the second main gear 151.

For another example, the second set of transmission gears 122 may include a first transmission gear 155 coupled to the output end 130*b* of the clutch mechanism 130. Specifically, the first transmission gear 155 may be rotatably fixed on the bottom cover 102 through a fourth shaft 156.

Further, a fourth accommodating portion 157 may be fixed on the bottom cover 102, and the fourth shaft 156 may be inserted into an accommodating hole provided on the fourth accommodating portion 157, to fix the first transmission gear 155.

Further, the second set of transmission gears 122 may further include a second transmission gear 158. The second transmission gear 158 is engaged with the first transmission gear 155, and a second through hole 159 for the door shaft 203 to pass through is provided on the second transmission gear 158 axially.

Further, the second through hole 159 may have a notch 159*a*, so that the door shaft 203 passing through and the second transmission gear 122 may not move relatively.

That is, the first transmission gear 155 may be the first gear of the second set of transmission gears 122, and the second transmission gear 158 may be the last gear of the second set of transmission gears 122. Such a design is beneficial to save space occupied by the automatic door device 100.

Therefore, when the clutch mechanism 130 is in an engaged state, after the output torque of the driving motor 110 is transmitted to the input end 130*a* of the clutch mechanism 130 through the first set of transmission gears 121, the output torque is further transmitted to the output end 130*b* of the clutch mechanism 130. Then, the output torque is transmitted to the second transmission gear 158 engaged with the first transmission gear 155 through the coupled first transmission gear 155, and the door shaft 203 is driven to rotate synchronously through the rotation of the second transmission gear 158. Therefore, based on the torque transmission of the transmission link, the output torque of the driving motor 110 can be effectively transmitted to the door shaft 203, to implement the automatic door function for the door body 202.

In actual application, the quantity of the gears or gear pairs included in the first set of transmission gears 121 may be one or more. That is, the first gear and the last gear of the first set of transmission gears 121 may be the same one. Similarly, the quantity of the gears or gear pairs included by the second set of transmission gears 122 may be one or more. That is, the first gear and the last gear of the second set of transmission gears 122 may be the same one.

In an embodiment, with reference to FIG. 1 to FIG. 6, the clutch mechanism 130 may include: a first main gear 131, coupled to the last gear in the first set of transmission gears 121; and a first auxiliary gear 132, disposed coaxially with the first main gear 131, and coupled to the first gear in the second set of transmission gears 122. A limiting portion 133 is disposed at one side of the first main gear 131 facing the first auxiliary gear 132, and an adaptation portion 134 is disposed at one side of the first auxiliary gear 132 facing the first main gear 131. When the first main gear 131 is driven by the first set of transmission gears 121 to rotate to the limiting portion 133 to abut against the adaptation portion 134, the clutch mechanism 130 is in an engaged state; and when the first auxiliary gear 132 is driven by the second set of transmission gears 122 to rotate to the adaptation portion 134 to be separated from the limiting portion 133, the clutch mechanism 130 is in a separated state. Therefore, through the cooperation between the limiting portion 133 and the adaptation portion 134, the clutch mechanism 130 can freely switch between the engaged state and the separated state, to implement connection and disconnection of the transmission link.

For example, the first main gear 131 is engaged with the second auxiliary gear 152, and the first auxiliary gear 132 is engaged with the first transmission gear 155.

Further, the first main gear 131 and the second main gear 132 may be rotatably fixed on the bottom cover 102 through a fifth shaft 135. Correspondingly, a fifth accommodating portion 136 is fixed on the bottom cover 102, and the fifth shaft 136 may be inserted into an accommodating hole provided on the fifth accommodating portion 136, to fix the first main gear 131 and the second main gear 132.

Figure 5:
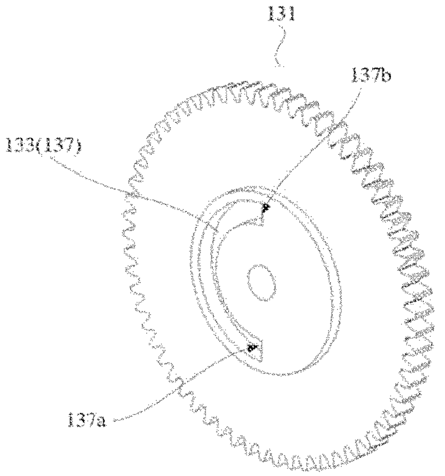
FIG. 5 is a schematic diagram of a first main gear in FIG. 4.

In an embodiment, referring to FIG. 2 and FIG. 5, the limiting portion 133 may include a limiting groove 137, and the limiting groove 137 may have a first closed end 137*a* and a second closed end 137*b*.

Further, the clutch mechanism 130 is in an engaged state when the limiting groove 137 rotates with the first main gear 131 to the adaptation portion 134 to abut against the first closed end 137*a* or the second closed end 137*b*.

Further, the clutch mechanism 130 is in a separated state when the adaptation portion 134 rotates with the first auxiliary gear 132 to be separated from the first closed end 137*a* or the second closed end 137*b* and slides in the limiting groove 137.

Therefore, when the limiting groove 137 rotates with the first main gear 131 to the adaptation portion 134 to abut against the first closed end 137*a* or the second closed end 137*b*, the clutch mechanism 130 is in an engaged state and the door shaft 203 can rotate along the opening direction or the closing direction under the drive of the driving motor 110; and when the door shaft 203 is subjected to an external torque in the same direction, the design of the limiting groove 137 provides a free motion distance for the adaptation portion 134, so that the door shaft 203 can accelerate the rotation without being limited by the resistance of the driving motor 110.

Figure 6:
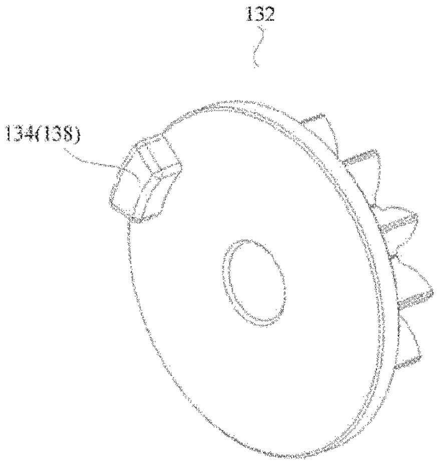
FIG. 6 is a schematic diagram of a first auxiliary gear in FIG. 4.

Further, referring to FIG. 6, the adaptation portion 134 may include a boss 138, to be effectively coupled to the limiting groove 137, to ensure that the clutch mechanism 130 can flexibly switch between the engaged state and the separated state.

Further, the engaged state of the clutch mechanism 130 may include a first engaged state and a second engaged state. When the boss 138 abuts against the first closed end 137*a* of the limiting groove 137, the clutch mechanism 130 is in the first engaged state; and when the boss 138 abuts against the second closed end 137*b* of the limiting groove 137, the clutch mechanism 130 is in the second engaged state.

It is assumed that when the first main gear 131 and the first auxiliary gear 132 rotate along a clockwise direction, the direction is an opening direction. When the clutch mechanism 130 is in the first engaged state, the output torque of the driving motor 110 is transmitted to the door shaft 203 through the transmission link, and the door body 202 can be controlled to open automatically; and when the clutch mechanism 130 is in the second engaged state, the output torque of the driving motor 110 is transmitted to the door shaft 203 through the transmission link, and the door body 202 can be controlled to close automatically.

Figure 7:
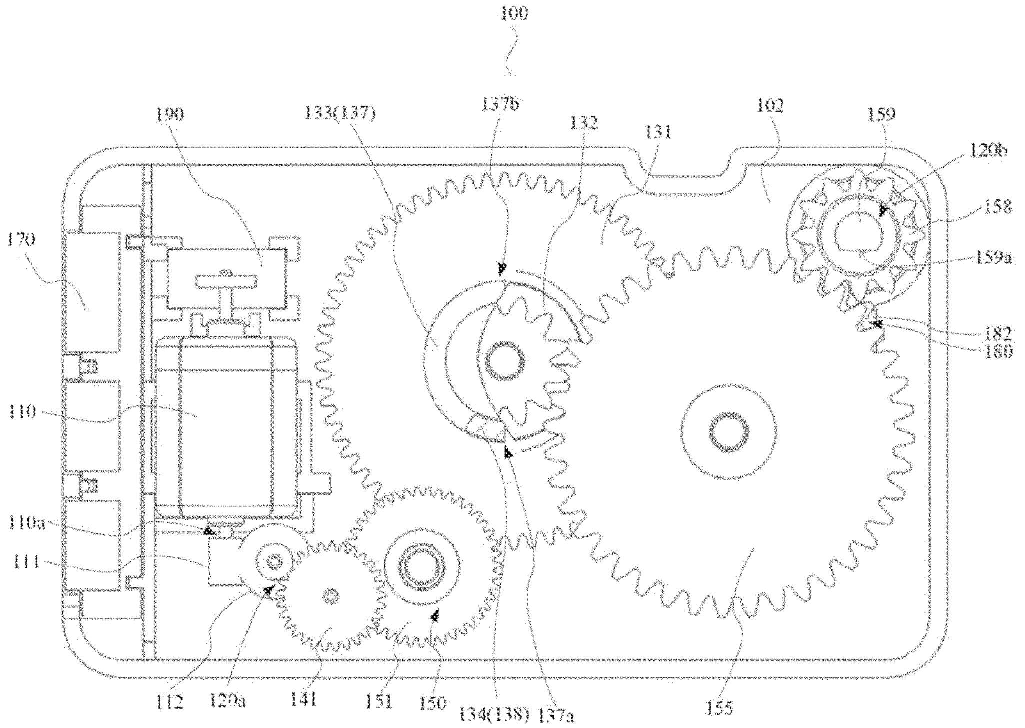
FIG. 7 is a schematic diagram when the clutch mechanism shown in FIG. 4 is in a first engaged state.

In a typical application scenario, referring to FIG. 7, the boss 138 abuts against the first closed end 137*a* of the limiting groove 137, and the output torque of the driving motor 110 is transmitted to the first main gear 131 through the first set of transmission gears 121, so that the first main gear 131 rotates along the clockwise direction. In this case, because the boss 138 abuts against the first closed end 137*a* of the limiting groove 137, the first auxiliary gear 132 rotates clockwise synchronously under the drive of the first main gear 131, to further drive the first transmission gear 155 engaged with the first auxiliary gear 132 to rotate, and the rotation of the first transmission gear 155 further drives the second transmission gear 158 engaged with the first transmission gear 155 to rotate. Therefore, the clutch mechanism 130 in the first engaged state transmits the output torque of the driving motor 110 to the door shaft 203, to implement automatic door opening.

Figure 8:
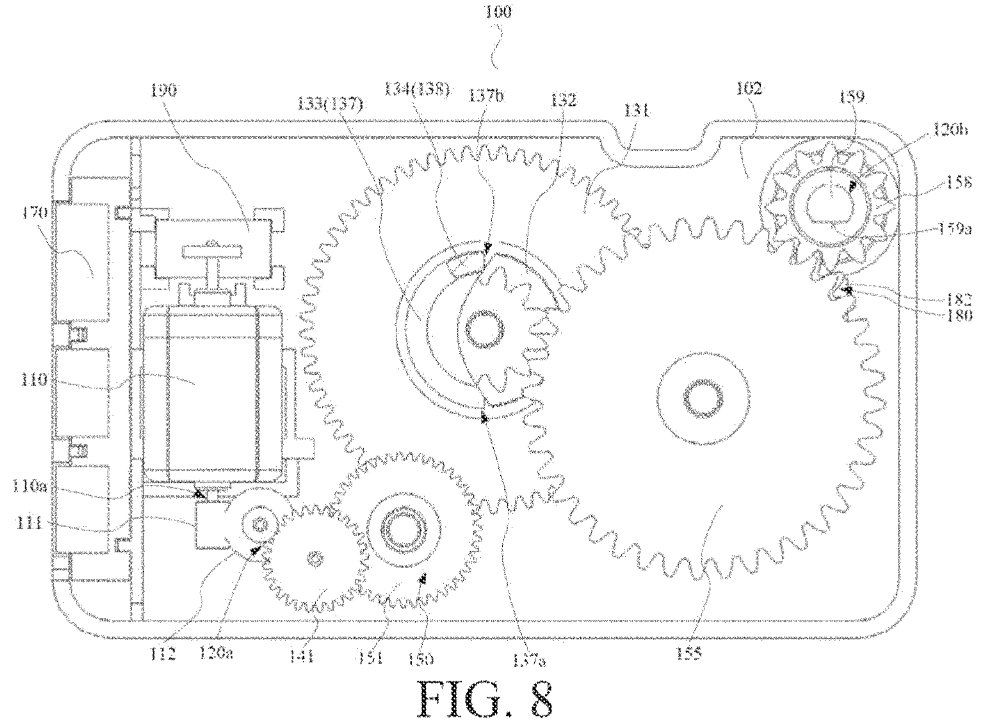
FIG. 8 is a schematic diagram when the clutch mechanism shown in FIG. 4 is in a second engaged state.

In another typical application scenario, referring to FIG. 8, the boss 138 abuts against the second closed end 137*b* of the limiting groove 137, and the output torque of the driving motor 110 is transmitted to the first main gear 131 through the first set of transmission gears 121, so that the first main gear 131 rotates along an anticlockwise direction. In this case, because the boss 138 abuts against the second closed end 137*b* of the limiting groove 137, the first auxiliary gear 132 rotates anticlockwise synchronously under the drive of the first main gear 131, to further drive the first transmission gear 155 engaged with the first auxiliary gear 132 to rotate, and the rotation of the first transmission gear 155 further drives the second transmission gear 158 engaged with the first transmission gear 155 to rotate. Therefore, the clutch mechanism 130 in the second engaged state transmits the output torque of the driving motor 110 to the door shaft 203, to implement automatic door closing.

Figure 9:
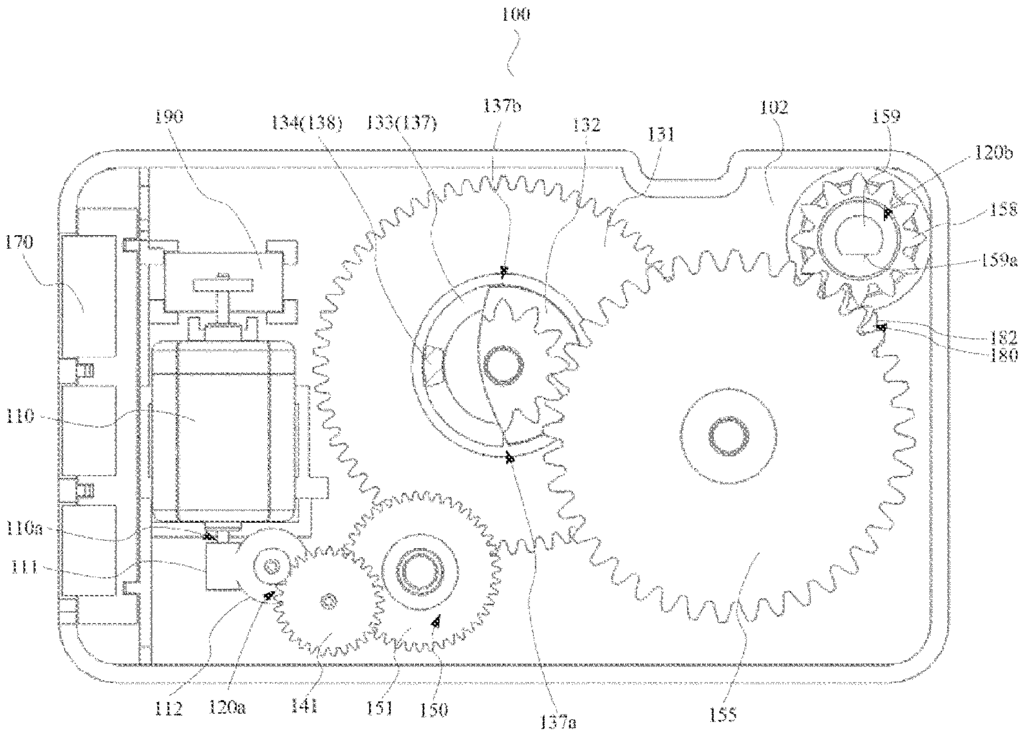
FIG. 9 is a schematic diagram when the clutch mechanism shown in FIG. 4 is in a separated state.
Figure 10:
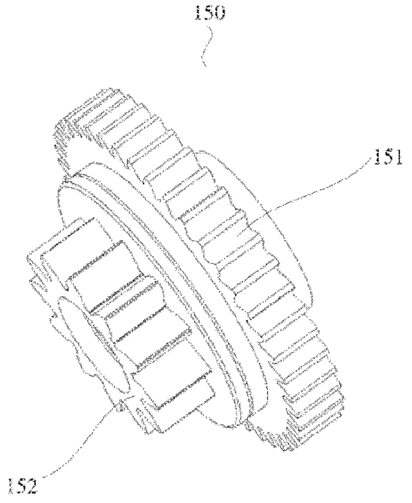
FIG. 10 is a schematic diagram of a torque control mechanism in FIG. 1.
Figure 11:
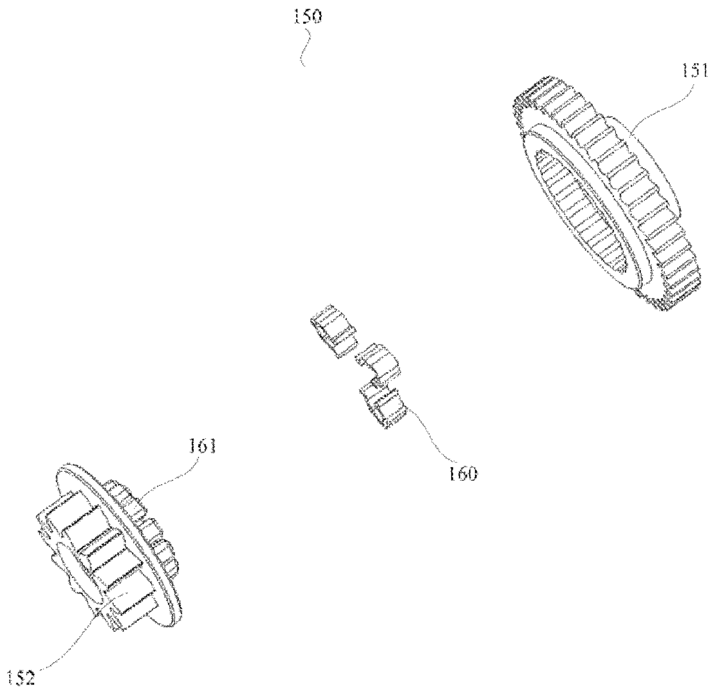
FIG. 11 is an exploded view of the torque control mechanism shown in FIG. 10.

In still another typical application scenario, with reference to FIG. 7 and FIG. 9, when the first auxiliary gear 132 rotates with the first main gear 131 synchronously along the clockwise direction, if the door shaft 203 is subjected to an external torque in the same direction with the current rotation direction. Under the action of the external torque in the same direction, the door shaft 203 may in turn drive the second transmission gear 158 to rotate faster along the current rotation direction. Further, the second transmission gear 158 drives the first transmission gear 155 engaged with the second transmission gear 158 to rotate faster along the current rotation direction, and the first transmission gear 155 drives the first auxiliary gear 132 engaged with the first transmission gear 155 to rotate faster along the clockwise direction.

In this case, under the action of the external torque in the same direction, the rotation speed of the first auxiliary gear 132 along the clockwise direction is greater than the rotation speed of the first main gear 131 along the clockwise direction. The rotation speed of the first main gear 131 along the clockwise direction is determined by the output torque of the driving motor 110 transmitted through the first set of transmission gears 121.

Because the first auxiliary gear 132 moves relatively relative to the first main gear 131 along the clockwise direction, as shown in FIG. 9, the boss 138 leaves the first closed end 137*a* of the limiting groove 137, and slides along the limiting groove 137. During the sliding, the clutch mechanism 130 enters the separated state, the output torque of the driving motor 110 cannot be transmitted to the door shaft 203 due to the disconnection of the transmission link. Therefore, the door shaft 203 may move casually under the action of the external torque without being affected by the output torque of the driving motor 110.

Therefore, in the scenarios shown in FIG. 7 and FIG. 9, accelerating the opening of the door may be implemented by manual operation of the user on a basis of automatic opening of the door at a constant speed.

In another typical application scenario, with reference to FIG. 8 and FIG. 9, when the first auxiliary gear 132 rotates with the first main gear 131 synchronously along the anticlockwise direction, if the door shaft 203 is subjected to an external torque in the same direction with the current rotation direction, under the action of the external torque in the same direction, the door shaft 203 may in turn drive the second transmission gear 158 to rotate faster along the current rotation direction. Further, the second transmission gear 158 drives the first transmission gear 155 engaged with the second transmission gear 158 to rotate faster along the current rotation direction, and the first transmission gear 155 drives the first auxiliary gear 132 engaged with the first transmission gear 155 to rotate faster along the anticlockwise direction.

In this case, under the action of the external torque in the same direction, the rotation speed of the first auxiliary gear 132 along the anticlockwise direction is greater than the rotation speed of the first main gear 131 along the anticlockwise direction. The rotation speed of the first main gear 131 along the anticlockwise direction is determined by the output torque of the driving motor 110 transmitted through the first set of transmission gears 121.

Because the first auxiliary gear 132 moves relatively relative to the first main gear 131 along the anticlockwise direction, as shown in FIG. 9, the boss 138 leaves the second closed end 137*b* of the limiting groove 137, and slides along the limiting groove 137. During the sliding, the clutch mechanism 130 enters the separated state, the output torque of the driving motor 110 cannot be transmitted to the door shaft 203 due to the disconnection of the transmission link. Therefore, the door shaft 203 may move casually under the action of the external torque without being affected by the output torque of the driving motor 110.

Therefore, in the scenarios shown in FIG. 8 and FIG. 9, accelerating the closing of the door may be implemented by manual operation of the user on a basis of automatic closing of the door at a constant speed.

Figure 4:
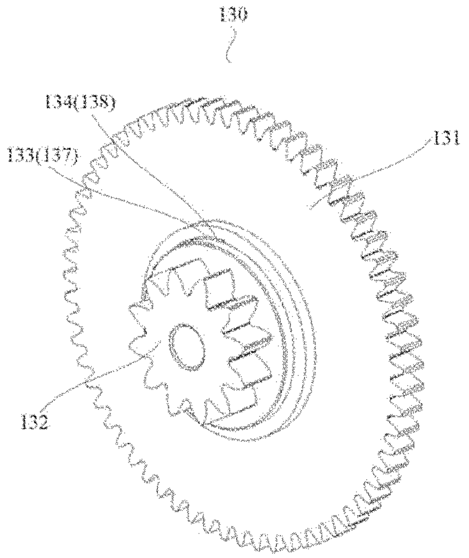
FIG. 4 is a schematic diagram of a clutch mechanism in FIG. 1.

In still another typical application scenario, when a turning angle (may also be referred to as a rotation angle) of the door shaft 203 is zero, that is, when the door body 202 is located at the closing location, the clutch mechanism 130 may be in the first engaged state shown in FIG. 4, to implement the automatic door opening function in time when an automatic door opening instruction is received.

Alternatively, when the door body 202 is located at the closing location, the clutch mechanism 130 may be in the separated state shown in FIG. 9, to provide a certain free opening angle to flexibly meet the user requirement. When the automatic door opening instruction is received at the location, the driving motor 110 controls, by outputting a proper output torque, the first main gear 131 to rotate clockwise to the location shown in FIG. 7, so that the boss 138 abuts against the first closed end 137*a* of the limiting groove 137, to further implement the automatic door opening function.

Similarly, when the turning angle of the door shaft 203 is a maximum rotatable angle, that is, when the door body 202 is located at the maximum opening location, the clutch mechanism 130 may be in the second engaged state shown in FIG. 8, to implement the automatic door closing function in time when an automatic door closing instruction is received.

Alternatively, when the door body 202 is located at the maximum opening location, the clutch mechanism 130 may be in the separated state shown in FIG. 9, to provide a certain free opening angle to flexibly meet the user requirement. When the automatic door opening instruction is received at the location, the driving motor 110 controls, by outputting a proper output torque, the first main gear 131 to rotate anticlockwise to the location shown in FIG. 8, so that the boss 138 abuts against the second closed end 137*b* of the limiting groove 137, to further implement the automatic door closing function.

In actual application, by adjusting the provided angle of the limiting groove 137 along the circumferential direction of the first main gear 131, and/or the width of the boss 138 along the circumferential direction of the first auxiliary gear 132, the maximum angle at which the first main gear 131 and the first auxiliary gear 132 can rotate relatively may be adjusted, to further adjust the maximum angle of the automatic door.

It should be noted that, although the clockwise rotation direction is used as the opening direction in this embodiment for description, in actual application, a person skilled in the art may flexibly adjust an association relationship between the rotation direction and/or the opening/closing direction of the first main gear 131 and the first auxiliary gear 132, which is not repeated herein.

In an embodiment, referring to FIG. 2 and FIG. 10 to FIG. 13, the automatic door device 100 may further include a torque control mechanism 150 disposed on the transmission link of the transmission system 120. When the door shaft 203 is subjected to an external torque in a reversed direction, the torque control mechanism 150 is adapted to disconnect the transmission link. The reversed direction refers to being in the reversed direction with the torque applied by the transmission system 120 to the door shaft 203. Therefore, when the rotation direction of the door body 202 applied by the user and the rotation direction of the door shaft 203 applied by the driving motor 110 are reversed, the transmission link can be disconnected by the torque control mechanism 150, to protect the driving motor 110 and the transmission system 120.

In an embodiment, the torque control mechanism 150 may include: a second main gear 151, coupled to the last gear in the first set of transmission gears 121; a second auxiliary gear, disposed coaxially with the second main gear 151 and coupled to the input end 130*a* of the clutch mechanism 130; and an elastic piece 160, adapted to connect the second main gear 151 and the second auxiliary gear 152.

For example, the second main gear 151 may be engaged with the third auxiliary gear 142, and the second auxiliary gear 152 may be engaged with the first main gear 131.

Further, when a rotation direction of the second main gear 151 and a rotation direction of the second auxiliary gear 152 are reversed, and a torque transmitted by the second auxiliary gear 152 on the elastic piece 160 is greater than a preset threshold, the second main gear 151 and the second auxiliary gear 152 release to disconnect the transmission link.

In other words, when the rotation directions of the second main gear 151 and the second auxiliary gear 152 are the same, or although the rotation directions are reversed but the transmitted torque is less than the preset threshold, the second main gear 151 and the second auxiliary gear 152 rotate synchronously, and there is no relative rotation between the two gears in the circumferential direction. In this case, the transmission link is in a connection state. When the rotation directions of the second main gear 151 and the second auxiliary gear 152 are reversed, and the transmitted torque is greater than the preset threshold, the second main gear 151 and the second auxiliary gear 152 release under the action of the elastic piece 160, and relative rotation is generated between the two gears in the circumferential direction to disconnect the transmission link. Therefore, the transmission link can be actively disconnected when the torque is excessive due to abnormal operation, to protect the driving motor 110 and the transmission system 120, and prolong the service life of components.

Figure 12:
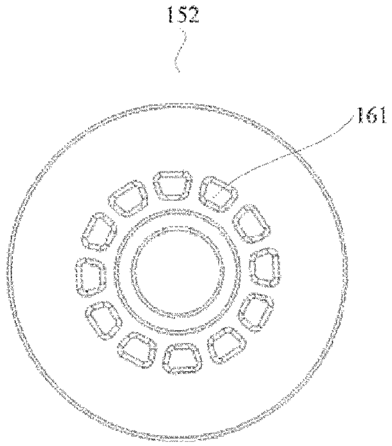
FIG. 12 is a top view of a second main gear in FIG. 10.
Figure 13:
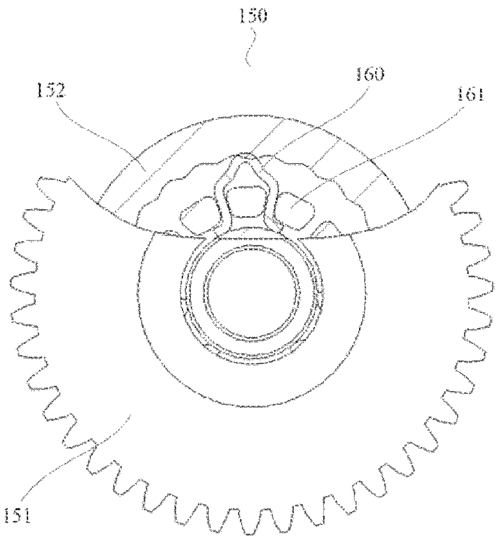
FIG. 13 is a half sectional view of the torque control mechanism shown in FIG. 10.

For example, referring to FIG. 12 and FIG. 13, a plurality of protruding portions 161 are disposed on one side of the second auxiliary gear 152 facing the second main gear 151, and the protruding portions 161 are adapted to clamp the elastic piece 160. In a clamped state, the second auxiliary gear 152 and the second main gear 151 rotate along the same direction and there is no relative rotation between the two gears.

The case in which the direction that the first main gear 131 rotates clockwise is the opening direction is still used as an example. During automatic opening of the door, as shown in FIG. 7, the boss 138 abuts against the first closed end 137*a* of the limiting groove 137 all the time. In this case, if the user intends to close the door, the door body 202 is subjected to an external torque in the reversed direction. The external torque is transmitted to the first auxiliary gear 132 through the second set of transmission gears 122, and because the boss 138 already abuts against the first closed end 137*a* of the limiting groove 137, the external torque acts on the first main gear 131 in real time to make the first main gear 131 basically stop rotating.

Further, the external torque to which the first main gear 131 is subjected is transmitted to the second auxiliary gear 152 engaged with the first main gear 131, so that the rotation direction of the second auxiliary gear 152 and the rotation direction of the second main gear 151 under the action of the output torque of the driving motor 110 are reversed. When the reversed transmitted torque is greater than the preset threshold, the elastic piece 160 is separated from the protruding portions 161, to make the second main gear 151 and the second auxiliary gear 152 release.

In this case, the transmission link is disconnected. On one hand, the user may casually operate the opening/closing direction and speed, and on the other hand, the reversed external torque may not act on the driving motor 110, thereby implementing the effect of protecting the driving motor 110 and the transmission system 120.

Further, when the second auxiliary gear 152 rotates to a location at which one protruding portion 161 on the second auxiliary gear 152 matches with the location of the elastic piece 160 again, the elastic piece 160 automatically falls back to clamp the protruding portion 161. In this case, the transmission link is connected again.

Similarly, during automatic closing of the door, as shown in FIG. 8, the boss 138 abuts against the second closed end 137*b* of the limiting groove 137 all the time. In this case, if the user intends to open the door again and applies a reversed external torque to the door body 202, through the cooperation of the elastic piece 160, the second main gear 151 and the second auxiliary gear 152 may release as well, to achieve the effect of protecting the driving motor 110 and the transmission system 120.

Further, the torque control mechanism 150 is further adapted to protect the driving motor 110 and the transmission system 120 when the door is excessively opened. For example, in a case of the location shown in FIG. 7, when the door shaft 203 already rotates to the maximum opening angle, if the direction of the subjected external torque is still the opening direction, the second main gear 151 and the second auxiliary gear 152 may be controlled by using the elastic piece 160 to release, to achieve the effect of protecting the driving motor 110 and the transmission system 120.

Further, the torque control mechanism 150 is further adapted to protect the driving motor 110 and the transmission system 120 when the external torque in the same direction is excessive. For example, during clockwise rotation, under the action of the external torque in the same direction, when the boss 138 moves from the first closed end 137*a* of the limiting groove 137 shown in FIG. 7 to abut against the second closed end 137*b* of the limiting groove 137 shown in FIG. 8 through the location shown in FIG. 9, if the external torque in the same direction is still acting, the first auxiliary gear 132 may in turn drive the first main gear 131 to rotate.

In this case, although the transmitted torque to which the second auxiliary gear 152 engaged with the first main gear 131 is subjected and the output torque of the driving motor 110 to which the second main gear 151 is subjected are in the same direction, when the transmitted torque to which the second auxiliary gear 152 is subjected is greater than the preset threshold if the external torque in the same direction is greater, the second main gear 151 and the second auxiliary gear 152 may be controlled by using the elastic piece 160 to release as well, to achieve the effect of protecting the driving motor 110 and the transmission system 120.

In this case, during the automatic opening of the door, in a case that the user opens the door vigorously, the transmission link can be disconnected in time by the torque control mechanism 150, to prevent the transmission system 120 and the driving motor 110 from being damaged by the excessive external torque in the same direction while ensuring that the user to open the door softly.

Similarly, during the automatic opening of the door, in a case that the user closes the door vigorously, the transmission link may be disconnected in time by the torque control mechanism 150 as well, to prevent the transmission system 120 and the driving motor 110 from being damaged by the excessive external torque in the same direction while ensuring that the user to close the door softly.

In an embodiment, referring to FIG. 2 and FIG. 13, the quantity of the elastic pieces 160 may be 3 and the elastic pieces are clamped between the protruding portions 161 of the second auxiliary gear 152 in a uniformly distributed manner at an interval of 120 degrees.

In actual application, the preset threshold may be adjusted by adjusting the quantity and the elastic force of the elastic pieces 160. Therefore, based on the elastic cooperation structure formed by the elastic pieces 160, the second main gear 151, and the second auxiliary gear 152, the transmission link of the transmission system 120 may be disconnected when the torque is excessive due to abnormal operation. Further, a maximum torque for releasing may be freely set according to the elastic force and the quantity of the elastic pieces 160, to protect the entire automatic door device 100 when the load is excessive.

In an embodiment, referring to FIG. 1 and FIG. 2 again, the automatic door device 100 may further include a control module 170. The control module 170 is coupled to the driving motor 110, and the driving motor 110 determines an output torque according to a driving instruction sent by the control module 170. Therefore, the running state of the driving motor 110 is adjusted by the control module 170, to implement the automatic door function.

Specifically, a first fixing portion 171 may be disposed on the bottom cover 102, and is adapted to accommodate and fix the control module 170.

In a typical application scenario, in response to the external torque in a reversed direction to which the door shaft 203 is subjected, the control module 170 may send an updated driving instruction to instruct the driving motor 110 to output a reversed output torque. Therefore, when a reversed operation of the user to the door body 202 is sensed, the driving motor 110 is controlled in time to adjust the output torque, so that the driving direction of the transmission system 120 to the door shaft 203 meets user expectation.

For example, it is assumed that the control module 170 receives a door opening instruction sent by the user, the control module 170 generates a corresponding driving instruction and sends the instruction to the driving motor 110, and in response to the driving instruction, the driving motor 110 outputs a suitable output torque to drive the door shaft 203 to rotate through the transmission system 120, to implement automatic opening of the door.

In this process, the user suddenly intends to close the door and directly operates the door body 202 to move toward the direction for closing the door. In this case, the door shaft is subjected to the external torque in the reversed direction, the boss 138 abuts against the first closed end 137*a* of the limiting groove 137, and the transmitted torque for the first auxiliary gear 132 is disconnected under the action of the torque control mechanism 150.

Meanwhile, because the boss 136 abuts against the first closed end 137*a* of the limiting groove 137, the resistance to which the transmission system is subjected is increased, and the current on the driving motor 110 is correspondingly increased. The control module determines that the door body 202 is subjected to the external torque in the reversed direction when the increase of the current is detected.

Further, the control module 170 generates an updated driving instruction to instruct the driving motor 110 to output a data torque of which the direction is reversed to that of the foregoing output torque, so that the first main gear 131 can rotate along the direction reversed to the foregoing rotation direction. That is, the first main gear rotates, in the same direction with the reversed external torque, to make the boss 138 at least separated from the first closed end 137*a* of the limiting groove 137, so that the door body 202 may be in a freely opened/closed state.

In other words, when it is detected that the door shaft 203 is subjected to an external torque in a reversed direction, the clutch mechanism 130 is controlled to enter a separated state by using the control module 130, to better meet the user requirement.

Further, the updated driving instruction of the control module 130 is further adapted to enable the output torque in a reversed direction of the driving motor 110 to support the first main gear 131 to move to the second closed end 137*b* of the limiting groove 137 to abut against the boss 138, so that the door shaft 203 can be closed automatically. Therefore, during automatic opening of the door, it may be switched to an automatic door closing state in time due to the reversed closing operation of the user.

Figure 14:
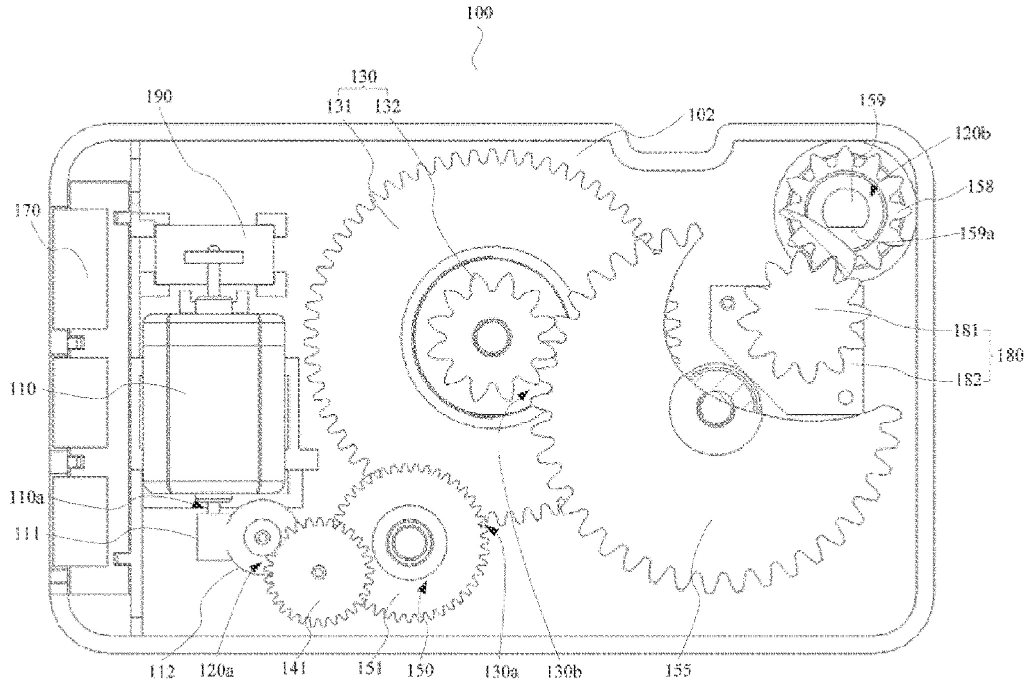
FIG. 14 is a schematic diagram of an angle sensing module in FIG. 1.

In an embodiment, referring to FIG. 1, FIG. 2, and FIG. 14, the automatic door device 100 may further include an angle sensing module 180, coupled to the door shaft 203 and the control module 170, and adapted to sense and send a rotation angle of the door shaft 203 to the control module 170. Therefore, the location of the door body 202 is detected in real time by the angle sensing module 180, and the control module 170 can determine the running state of the driving motor 110 and/or the real-time state of the clutch mechanism 130 according to the real-time location of the door body 202, to implement different actions according to different locations of the door body 202.

Further, the angle sensing module 180 may include: a third transmission gear 181, rotating with the door shaft 203 synchronously; and an angle sensor 182, connected to the third transmission gear 181, to sense a rotation angle of the third transmission gear 181. Therefore, the rotation angle of the door shaft 203 can be precisely detected by using the third transmission gear 181, to determine the real-time location of the door body 202.

Specifically, the third transmission gear 181 is engaged with the second transmission gear 158. Therefore, the third transmission gear 181 and the second transmission gear 158 rotate synchronously, so that the rotation angle of the door shaft 203 can be accurately collected by the angle sensor 182 through the second transmission gear 158 and the third transmission gear 181.

Further, one side of the third transmission gear 181 facing the bottom cover 102 includes a fixing shaft, a third through hole 182 is provided on the angle sensor 182, and the fixing shaft passes through the third through hole 194 and is then inserted into the accommodating hole provided on the sixth accommodating portion 182, to fix the third transmission gear 181 and the angle sensor 182.

In a variant, the third transmission gear 181 may be omitted. That is, the angle sensor 182 may be directly coupled to the second transmission gear 158, to accurately detect the rotation angle of the door shaft 203.

Alternatively, the third transmission gear 181 may include one or more gears engaged with each other sequentially, to implement effective transmission of the rotation angle of the door shaft 203.

In an embodiment, the relative locations of the first main gear 131 and the first auxiliary gear 132 may be given freely according to the cooperation between the control module 130 and the angle sensing module 180. For example, when the door shaft 203 is in a static state, the first main gear 131 may be controlled to move to make the location of the boss 138 in the limiting groove 137 be as shown in FIG. 9, so that the door body 202 both have a certain automatic movement distance in the opening and closing directions.

Further, the location of the door body 202 may be fed back to the control module 170 in real time according to the cooperation between the control module 170 and the angle sensing module 180. Because the door shaft 203 is coupled to the first auxiliary gear 132, the angle sensing module 180 may transmit the location of the first auxiliary gear 132 to the control module 170 in real time. Correspondingly, the control module 170 may control the driving motor 110 to adjust the location of the first main gear 131 relative to the first auxiliary gear 132, to control the connection or disconnection of the transmission link.

In an embodiment, when the rotation angle of the door shaft 203 is not zero and the door shaft 203 is in the static state for preset duration, the control module 170 may generate the driving instruction, and the driving instruction is adapted to control the driving motor 110 to output an output torque along the closing direction, to drive, through the transmission system 120, the door shaft 203 to rotate to close the door shaft 202. Therefore, automatic closing of the door body 202 can be implemented in a case that the door is not closed in a long time, to achieve effects of energy saving and environmental protection.

The rotation angle of the door shaft 203 refers to an angle rotating by using a location at which the door body 202 closes the body 201 of the household appliance as a starting location.

Preferably, the preset duration may be 5 minutes. In actual application, a person skilled in the art may adjust the specific value of the preset duration according to requirements, to meet power-saving requirements in different application scenarios.

In an embodiment, when the rotation angle of the door shaft 203 is a first preset angle and a door closing instruction sent by a user is received, a first reminding signal is sent. Therefore, when the door closing instruction sent by the user is not adapted to the current location of the door body 202, a first reminding signal may be sent to remind the user to modify the door closing instruction in time, to prevent the user from performing wrong operation to damage the door body 202, thereby prolonging the service life of the door body 202.

For example, when the angle sensing module 180 detects that the rotation angle of the door shaft 203 is zero, that is, when the door body 202 is located at the closing location, if the door closing instruction is received, the control module 170 does not respond to the door closing instruction and sends the first reminding signal, to remind the user that the door body 202 is already located at the closing location. In this example, the first preset angle may be 0°.

In an embodiment, when the rotation angle of the door shaft 203 is a second preset angle and a door opening instruction sent by a user is received, a second reminding signal is sent. Therefore, when the door opening instruction sent by the user is not adapted to the current location of the door body 202, a reminding signal may be sent to remind the user to modify the door opening instruction in time, to prevent the user from performing wrong operation to damage the door body 202, thereby prolonging the service life of the door body 202.

For example, when the angle sensing module 180 detects that the rotation angle of the door shaft 203 is a maximum rotatable angle, that is, when the door body 202 is opened to the maximum angle, if the door opening instruction is received, the control module 170 does not respond to the door opening instruction and sends the second reminding signal, to remind the user that the door body 202 is already located at the maximum opening location. In this example, the second preset angle may be the maximum opening angle of the door body 202, such as 120°.

In an embodiment, a trigger manner of the door closing instruction and/or the door opening instruction may be selected from: key pressing, voice input and motion sensing. Therefore, the operation methods of the user are enriched by using various instruction trigger manners, thereby improving the operation convenience of the user and optimizing the user experience.

For example, the motion sensing may include preset gestures, and when it is sensed that the user makes a preset gesture, the control module 170 generates a corresponding driving instruction.

In an embodiment, referring to FIG. 1 and FIG. 2 again, the automatic door device 100 may further include a speed monitoring module 190, coupled to the control module 170, and adapted to monitor and send running parameters of the driving motor 110 to the control module 170. Therefore, the running parameters of the driving motor 110 can be detected in real time and fed back to the control module 170, so that the control module 170 can properly adjust the running state of the driving motor 110 according to the real-time running parameters of the driving motor 110, to make the automatic door control for the door shaft 203 meet the user expectation.

Specifically, a second fixing portion 191 may be disposed on the bottom cover 102, and is adapted to accommodate and fix the speed monitoring module 190.

Preferably, the speed monitoring module 190 may include a Hall sensor, to precisely detect the running parameters of the driving motor 110.

Further, the automatic door device 100 may further include a magnet 115. The magnet 115 rotates synchronously with the driving motor 110, and is adapted to cooperate with the Hall sensor. The Hall sensor may determine the rotation speed and the rotation direction of the driving motor 110 by sensing the rotation direction and the rotation speed of the magnet.

In an embodiment, the control module 170 may determine an updated driving instruction and send the instruction to the driving motor 110 according to the rotation angle of the door shaft 203 and the running parameters of the driving motor 110, to make a running speed of the door shaft 203 maintain constant. The updated driving instruction may include updated running parameters. Therefore, a stable door opening/closing speed can be implemented under different loads.

For example, during a single time of opening/closing of the door, based on the cooperation between the angle sensing module 180 and the speed monitoring module 190, the control module 170 may adjust the rotation speed of the driving motor 110 according to the real-time rotation angle of the door shaft 203 fed back by the angle sensing module 180, to control the output torque of the driving motor 110, to make the rotation speed of the door shaft 203 maintain constant.

For another example, for door bodies 202 with different loads, based on the cooperation between the respective angle sensing module 180 and the speed monitoring module 190, the corresponding control module 170 may properly determine the current rotation speed of the door shaft 203, to ensure that the door bodies 202 with different loads can open/close the door at a same and constant speed.

It should be noted that the solution of this embodiment may be adapted to an automatic door design for a sliding door as well. Specifically, the angle sensing module 180 is replaced with a location sensing module by connecting an external sliding track at the door shaft 203, to simply and conveniently implement the automatic door function of the sliding door.

FIG. 15 is a schematic diagram of a household appliance according to an embodiment of the present invention.

Specifically, the household appliance 200 may include a body 201 and a door body 202 connected to the front of the body 201, and further includes a door shaft 203. The door shaft 203 is adapted to hinge the body 201 and the door body 202, and the door body 202 may rotate around the door shaft 203.

Further, the household appliance 200 may further include an automatic door device 100 described above, and the automatic door device 100 is coupled to the door shaft 203 to drive the door shaft 203 to rotate.

For example, the door shaft 203 is adapted to pass through the second through hole 159 shown in FIG. 1, to be coupled to the automatic door device 100.

Therefore, by adopting the solution of this embodiment, the household appliance 200 is equipped with the automatic door device 100, which can implement an automatic door function.

Further, a clutch mechanism 130 is integrated in the automatic door device 100, and may actively disconnect the transmission link from the driving motor 110 to the door shaft 203 when a user needs to operate the door body 202 manually, so that the user does not feel the resistance of the driving motor 110 and the transmission system 120 during manual operation, thereby optimizing user experience.

In an embodiment, the door body 202 may include a door end cover 204, the door end cover 204 may include a shaft hole 205 to receive the door shaft 203, and the door end cover 204 is further adapted to accommodate the automatic door device 100. Therefore, according to the design in which the automatic door device 100 is integrated in the door end cover 204, the automatic door device 100 is in an invisible state to the outside, which facilitates the overall appearance of the household appliance 200.

For example, during assembly, after the door shaft 203 passes through the automatic door device 100, the automatic door device 100 may be placed at a suitable location of the door body 202, and then the automatic door device 100 is sealed by using the door end cover 204. One end of the door shaft 203 along the length direction stretches into the door body 202, and the other end stretches into the shaft hole 205 of the door end cover 204. The door end cover 204 is fixed to the body 201, to rotatably fix the door body 202 to the front of the body 201.

In an embodiment, a rotation angle of the door shaft 203 may be equal to a rotation angle $\alpha$ of the door body 202.

In a variant, the door body 202 may further be a door of a drawer, and the automatic door device 100 cooperates with a sliding track of the drawer, to implement a detachable automatic door function.

In actual application, in addition to the refrigerator shown in FIG. 15, the household appliance 200 of this embodiment may further be a dishwasher, a cooker hood, and the like. The automatic door device 100 is adapted to cooperate with any door body component that needs to be separated from or combined with the body of the household appliance 200 in the foregoing household appliance 200, to implement the detachable automatic door function.

Although specific implementation solutions are described in the foregoing content, these implementation solutions are not intended to limit the scope of the present disclosure, and a single implementation solution for describing a specific feature is the same. The feature embodiments provided in the present disclosure are exemplary rather than restrictive unless different expressions are made. In specific implementation, one or more technical features of dependent claims and technical features of independent claims may be combined, and technical features from corresponding independent claims may be combined in any suitable manner rather than merely according to the specific combinations listed in the claims.

Although the present invention is disclosed as above, the present invention is not limited thereto. A person skilled in the art may make various modifications and replacements without departing from the spirit and scope of the present invention. Therefore, the protection scope of the present invention should be subject to the scope limited by the claims.

What is claimed is:

1. An automatic door device, comprising:

a door shaft;

a driving motor having an output shaft;

a transmission system having an input end coupled to said output shaft of said driving motor, said transmission system having an output end coupled to said door shaft, said transmission system having a transmission link to transmit an output torque of said driving motor to said door shaft, said transmission system further having a first set of transmission gears with a first gear coupled to said output shaft of said driving motor and a last gear coupled to an input end of said clutch mechanism and a second set of transmission gears with a first gear coupled to an output end of said clutch mechanism and a last gear coupled to said door shaft; and a clutch mechanism disposed on said transmission link of said transmission system.

2. The automatic door device according to claim 1, wherein:

said clutch mechanism is in an engaged state if said door shaft is not subjected to an external torque; and said clutch mechanism enters a separated state to disconnect said transmission link if said door shaft is subjected to the external torque in a same direction.

3. The automatic door device according to claim 1, wherein said clutch mechanism comprises:

a first main gear coupled to said last gear in said first set of transmission gears; and a first auxiliary gear disposed coaxially with said first main gear, and coupled to said first gear in said second set of transmission gears;

a limiting portion disposed at one side of said first main gear facing said first auxiliary gear; and an adaptation portion disposed at one side of said first auxiliary gear facing said first main gear, wherein said clutch mechanism is in an engaged state if said first main gear is driven by said first set of transmission gears to rotate to said limiting portion to abut against said adaptation portion, and wherein said clutch mechanism is in a separated state if said first auxiliary gear is driven by said second set of transmission gears to rotate to said adaptation portion to be separated from said limiting portion.

4. The automatic door device according to claim 3, wherein:

said limiting portion has a limiting groove formed therein, said limiting groove has a first closed end and a second closed end;

said clutch mechanism is in an engaged state if said limiting groove rotates with said first main gear to said adaptation portion to abut against said first closed end or said second closed end; and said clutch mechanism is in a separated state if said adaptation portion rotates with said first auxiliary gear to be separated from said first closed end or said second closed end and slides in said limiting groove.

5. The automatic door device according to claim 1, further comprising a torque control mechanism disposed on said transmission link of said transmission system, wherein if said door shaft is subjected to an external torque in a reversed direction, said torque control mechanism is adapted to disconnect said transmission link.

6. The automatic door device according to claim 5, wherein said torque control mechanism comprises:

a second main gear coupled to said last gear in said first set of transmission gears;

a second auxiliary gear, disposed coaxially with said second main gear, and coupled to said input end of said clutch mechanism; and an elastic piece, adapted to connect said second main gear and said second auxiliary gear, wherein if a rotation direction of said second main gear and a rotation direction of said second auxiliary gear are reversed, and a torque transmitted by said second auxiliary gear on said elastic piece is greater than a preset threshold, said second main gear and said second auxiliary gear releases to disconnect said transmission link.

7. The automatic door device according to claim 5, further comprising a control module coupled to said driving motor, and said driving motor determining the output torque according to a driving instruction sent by said control module.

8. The automatic door device according to claim 7, wherein in response to an external output torque which is subjected to the door shaft and is in a reversed direction to which said door shaft was previously subjected, said control module sends an updated driving instruction to instruct said driving motor to output a reversed output torque.

9. The automatic door device according to claim 7, further comprising an angle sensing module coupled to said door shaft and said control module, and adapted to sense and send a rotation angle of said door shaft to said control module.

10. The automatic door device according to claim 9, wherein said angle sensing module has an angle sensor and a third transmission gear, rotating with said door shaft synchronously, said angle sensor, connected to said third transmission gear, to sense a rotation angle of said third transmission gear.

11. The automatic door device according to claim 9, wherein if the rotation angle of said door shaft is not zero and said door shaft is in a static state for preset duration, said control module generates the driving instruction.

12. The automatic door device according to claim 9, wherein:

if the rotation angle of said door shaft is a first preset angle and a door closing instruction sent by a user is received, a first reminding signal is sent; and/or if the rotation angle of said door shaft is a second preset angle and a door opening instruction sent by the user is received, a second reminding signal is sent.

13. The automatic door device according to claim 12, wherein a trigger manner of the door closing instruction and/or the door opening instruction is selected from key pressing, voice input and motion sensing.

14. The automatic door device according to claim 7, further comprising a speed monitoring module coupled to said control module, and adapted to monitor and send running parameters of said driving motor to said control module.

15. The automatic door device according to claim 14, wherein said speed monitoring module is a Hall sensor.

16. The automatic door device according to claim 7, wherein said control module determines an updated driving instruction and sends the updated driving instruction to said driving motor according to a rotation angle of said door shaft and running parameters of the driving motor, to make a running speed of said door shaft maintain constant, wherein the updated driving instruction contains updated running parameters.

17. A household appliance, comprising:

a body;

a door body connected to a front of said body;

a door shaft adapted to hinge said body and said door body, said door body rotating around said door shaft; and an automatic door device according to claim 1, said automatic door device coupled to said door shaft to drive said door shaft to rotate.

18. The household appliance according to claim 17, wherein said door body has a door end cover, wherein said door end cover has a shaft hole formed therein to receive said door shaft, and said door end cover is further adapted to accommodate said automatic door device.

* * * * *